3,828,095
AMINOALCOHOLS DERIVED FROM ORTHO-TRANS-HYDROXY-CINNAMIC ACIDS AND ESTERS
Eugene Boschetti, Venissieux, Darius Molho, Boulogne-sur-Seine, and Louis Fontaine, Lyon, France, assignors to Lipha, Lyonnaise Industrielle Pharmaceutique
No Drawing. Filed Apr. 5, 1972, Ser. No. 241,381
Claims priority, application France, Apr. 9, 1971, 7112668
Int. Cl. C07c 101/18
U.S. Cl. 260—471 R    10 Claims

ABSTRACT OF THE DISCLOSURE

Compounds represented by the formula

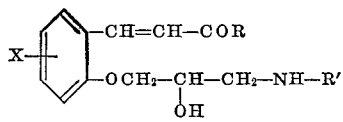

in which R is an optionally substituted hydroxy, alkoxy or amino radical, R' is a branched alkyl radical and X is hydrogen or a halogen. The compounds have a strong blocking activity on the B-sympathetic receptors in man, particularly in the treatment of chest angina and tachyarrhythmia.

---

The present invention relates to new derivatives of ortho-hydroxycinnamic acids and more particularly the aminoalcoholic ethers of these derivatives, the processes for their preparation and their applications. It is also concerned with obtaining intermediate products in the synthesis of certain new aminoalcoholic ethers.

The aminoalcohols of the invention can be used in chemical synthesis as intermediate products. Moreover, certain of these new compounds have a strong blocking activity on the β-sympathetic receptors in man, particularly in the treatment of chest angina and tachyarrhythmia.

The compounds forming the subject of the present invention are represented by the formula (I)

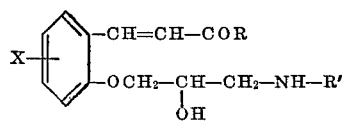   (I)

in which R is an optionally substituted hydroxy, alkoxy or amino radical, preferably a substituted aminoalkoxy radical, or guanidino radical: R' is a branched alkyl radical: X is hydrogen or a halogen.

Study of the N.M.R. shows that all the compounds are "trans" derivatives.

The mineral and organic acid salts of the compounds of formula I also form the subject of the invention.

When the substituent R in formula I represents an alkoxy radical, the new compounds can be obtained, according to the invention, by reacting an amine derivative of formula H$_2$N—R', in which R' has the same meaning as previously, with an epoxide of general formula (II)

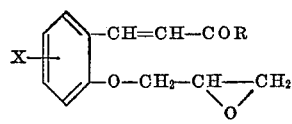   (II)

in which R is an alkoxy radical and X has the same meaning as previously. According to one preferred form, this condensation is effected with heat and reflux in a solvent.

When the substituent R in formula I represents the OH radical, the acids of formula III, in which X and R' have the same meanings as previously

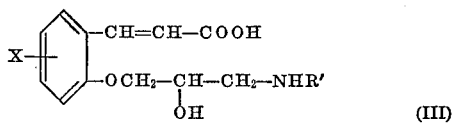   (III)

are obtained by saponifying esters represented by the formula I, when R is a lower alkoxy radical.

When the substituent R in formula I represents a substituted aminoalkoxy radical, the substituted aminoalkyl esters are obtained by condensation of the acids of formula III with the corresponding substituted haloalkylamines.

When the substituent R in formula I represents the guanidino radical, the amides are obtained by condensation of guanidine, either with the corresponding acids of formula III, or with the O-substituted hydroxycinnamic esters of formula IV

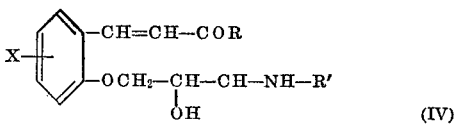   (IV)

in which R is an alkoxy radical while R' and X have the same meanings as previously.

The amides can be obtained from the acids or from the O-substituted hydroxycinnamic esters.

The epoxides according to formula II are new compounds and for this reason form part of the invention. They are obtained by action of the corresponding hydroxylated cinnamic esters on epichlorhydrin in the presence of an alkali carbonate.

The methyl 5-bromo-2-hydroxy-trans-cinnamate is a new compound and forms part of the invention as synthesis intermediary. It is obtained by condensation of 6-bromocoumarine in the presence of sodium methylate in methanol.

The pharmacological efficacy of the aminoalcohols of the application was determined by different methods.

In the first method, the active substances were studied on the isolated heart of a rabbit, kept alive by the Langendorff technique. When the heart is perfused with normal Locke-Ringer solution, there are recorded two control tachycardias obtained by intra-aortic injection of a standard dose of adrenalin. The heart is then perfused with a Locke-Ringer solution containing the β-blocking product to be tested, at a certain concentration. After this perfusion has taken place for ten minutes, the standard adrenalin injection is renewed. On the recordings obtained, there is measured the percentage of possible inhibition of the tachycardia caused by the product being studied. In this manner, the minimum active concentration is determined by starting with a maximum concentration of 5×10$^{-6}$, which is the minimum active concentration of "Nethalide," 2'-naphthyl-1-isopropylamino-2-ethanol hydrochloride. The second control product is "Propranolol, or 1-isopropylamino-3- (1'-napthoxy)-2- propanol hydrochloride.

The results obtained appear in the following table. The compounds carry the number of the examples from the following experimental chemical section, relating to the aminoalcohols derived from trans-hydroxycinnamic acids, their esters and their imides.

TABLE I

|  | | Percent |
|---|---|---|
| Nethalide | $5\times10^{-4}$ | 97 |
| Propranolol | $1\times10^{-4}$ | 88 |
| Example: | | |
| 1 | $0.625\times10^{-5}$ | 98 |
| 2 | $1\times10^{-4}$ | 91 |
| 3 | $5\times10^{-4}$ | 65 |
| 4 | $5\times10^{-4}$ | 96 |
| 5 | $2.5\times10^{-5}$ | 90 |
| 6 | $0.625\times10^{-4}$ | 80 |
| 7 | ᵃ $2.5\times10^{-4}$ | 96 |
| 8 | $5\times10^{-4}$ | 30 |
| 9 | $5\times10^{-4}$ | 35 |
| 10 | $2.5\times10^{-4}$ | 100 |
| Methyl m-(3-isopropylamino-2-hydroxypropoxy) trans-cinnamate | (ᵇ) | 0 |
| Para-(3-isopropylamino-2-hydroxypropoxy) trans-cinnamate derivative of methyl | (ᵇ) | 0 |

ᵃ Bradycardic.  ᵇ Inactive at $5\times10^{-4}$.

According to the second method, the tests are carried out on a cat anesthesised with "Nembutal," sodium ethyl methyl butyl barbiturate, repeated intravenous injections in a standard dose of 10 γ/kg. of adrenalin regularly causing comparable hyptertensions of 3 to 4 cc. of mercury. After intravenous injection of sympatholytic, phentolamine methane sulphonate, in the dose of 2 mg./kg., the adrenalin injections give hypotensive responses. It is said that the sympatholytic "reverses" the adrenalin. The β-blocking products then administered to the animal are capable of restoring the hyptertensive activity of the adrenalin on this preparation. All the products were tested in the standard dose of 500 micrograms per kg., applied intravenously, which is the really active dose for "Propranolol." The intensity of the hypertension obtained with adrenalin was noted, immediately after injection of the β-blocking agent and the time during which the restoration of its hypertensor effect is restored.

TABLE II

| Product (number of the Example) | Value of the 1st hypertension produced by adrenalin after β-blocking agent in cm. Hg | Time for restoration of the adrenalinic hypertension, hours |
|---|---|---|
| Propranolol | 2.8 | 3½ |
| Example: | | |
| 1 | 3.2 | 4 |
| 2 | 2.8 | 3 |
| 3 | 2.2 | 2 |
| 4 | 2.5 | 1½ |
| 5 | 2.6 | 2½ |
| 6 | 2.8 | 3½ |
| 7 | 4.1 | 3 |
| 8 | 1.0 | 1 |
| 9 | 1.4 | ½ |
| 10 | 2.14 | 2½ |
| Methyl m-(3-isopropyl-amino-2-hydroxypropoxy)-transcinnamate | ¹ Inactive | |
| Para-(3-isopropylamino-2-hydroxypropoxy)-trans-cinnamate derivative of methyl | ¹ Inactive | |

¹ Hypotension.

As a non-limiting example, eight clinical observations concerned with the compound of Example 1, i.e. the methyl ortho-(3 - isopropylamino-2-hydroxypropoxy) - trans-cinnamate hydrochloride, or LM 748, are reported.

The pharmaceutical compositions containing, as active principle, a compound according to the invention, either in the base form, or in the form of a corresponding organic or mineral salt, can be in the form of pills, tablets, gelatine capsules, dragees, aqueous suspensions, injecable solutions, aerosols, syrups and the like. The tablets may possibly be made gastro-resistant by being lacquered with a cellulose derivative.

One tablet formula is given below as a non-limiting example:

|  | Mg. |
|---|---|
| Active principle | 40 |
| Lactose | 182.5 |
| Starch | 50 |
| Gum arabic | 10 |
| Alginic acid | 2.5 |
| Potato starch | 12.5 |
| Magnesium stearate | 2.5 |

These pharmaceutical compositions contain, as active principle, a compound according to the invention and a physiologically acceptable solid or liquid pharmaceutical support or diluent, permitting the daily administration of doses of active principle which are between approximately 20 mg. and 1.00 mg.

Among the observations obtained in the clinical testing of the β-adrenolytic LM 748 (tablet made up to 40 mg. of active principle), it is possible to refer to the following eight observations:

1st observation: Mrs. J. R., 77 years old, affected by hypothyroidism, treated with thyroid extracts, also suffers from a myxedematous cardiopathy, a pericardic discharge and a coronary insufficiency. It is a matter of reducing the tachycardia caused by the thyroid extracts. The invalid receives 3 tablets of LM 748 per day for 10 days. The rhythm passes from 90 to 75 during the treatment period. The LM 748 is very well tolerated, both at the level of general tolerance and at the clinical level. Good result.

2nd observation: Mrs. J. L., 23 years old, suffering from Basedow disease, has a sinus tachycardia at 160. The daily dose of 3 tablets of LM 748 for 10 days reduces this tachycardia to 95 beats/minute. The medicine, which is very well tolerated, has a good bradycardic action.

3rd observation: Mrs. Cl. B., 68 years old, suffers from a severe chest angina "angor pectoris." For 7 days, she is given 3 tablets of LM 748 per day, associated with "Trinitrine," glycerine trinitric ester (the posology of this latter passes from 4 to 0 tablets). The rhythm is maintained at 75 beats/minute. The LM 748 has the desired bradycardic effect.

4th observation: Mr. C., 75 years old, suffering from tachyarhythmia due to auricular fibrillation developing for 3 months, is a hypertensive alcoholic, former heavy smoker (60 cigarettes per day—has not smoked for three months). Two attempts at heart manipulation were a failure. For 8 days, he receives 3 tablets a day, dose at 40 mg., of LM 748. There is observed a good reduction in the rhythm, which changes from 120 to 80 per minute, and a lowering of the arterial tension, which falls from 18/10 to 13/7. Very good tolerance of the medicine.

5th observation: Mr. P., 34 years old, a case of auricular flutter with irregular ventricular rhythm, totally asymptomatic, discovered three weeks before entering hospital, at home an alcoholic and smoker. After administering one tablet of LM 748 of 40 mg., three times a day, a very good tolerance is observed and also a good slowing down of the flutter waves with slowing down of the ventricular rhythm. The flutter becomes of type 4/1.

6th observation: Mr. Cl., 77 years old, a case of complete auriculoventricular blockage, fitted with a fixed rhythm pacemaker (68/min.), with a fixed rhythm pacemaker (68/min.), with parasystolic rhythm. On the electrocardiogram, there is observed a parasystolic rhythm with spontaneous complexes with long RP and appearance of left branch blockage and electrically induced complexes. The treatment was two tablets per day. The tolerance was good and the activity very satisfactory. In fact, there were observed the disappearance of the parasystolic rhythm by slowing down the spontaneous rhythm.

7th observation: Mr. L., 59 years old, case of 2/1 auricular flutter. An excellent result was obtained, with reduction of auricular flutter, maintenance of sinus rhythm, with three tablets of LM 748 per day.

8th observation: Mr. B, 68 years old, case of severe chest angina, previously treated unsuccessfully with "Amiodarone" (2-butyl-4-[(2-diethylaminoethoxy)-3,5-diiodobenzoyl]-benzofuran hydrochloride. Treatment with 1 tablet of LM 748 every 8 hours. Good result with bradycardia and considerable reduction in the taking of "Trinitrine" tablets (glycerine trinitric ester).

In conclusion, these eight different observations prove the efficacy and the good tolerance of the product.

Examples concerning the preparation of the new compounds and their intermediaries are given in a non-limiting manner.

EXAMPLE 1

Methyl ortho-(3-isopropylamino-2-hydroxypropoxy) trans-cinnamate

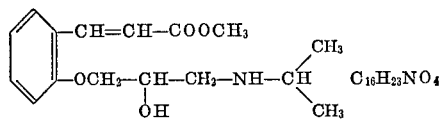

(a) Preparation of the methyl ortho-(2,3-epoxypropoxy) trans-cinnamate: 178 g. (1 mole) of methyl orthohydroxy trans-cinnamate, melting at 139° C. and prepared by the action of sodium methylate on coumarine (Bülmann-Annalen 388, 279) are placed in 1000 ml. of acetone in the presence of 165.6g of anhydrous potassium carbonate and 138.7 g. (1.5 moles) of epichlorhydrin. This mixture is refluxed for 14 hours. The acetonic solution is filtered, the acetone is distilled and the residue is rectified. There are obtained 117 g. (50%) of methyl ortho-(2,3-epoxypropoxy) trans-cinnamate:

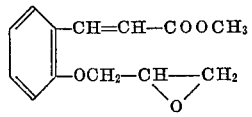

boiling at 157° C./0.25 millibar and melting at 57° C. (Gallenkamp apparatus).

GRAVIMETRIC ANALYSIS
$C_{13}H_{14}O_4$    M.W.=234.24

|  | Percent | |
|---|---|---|
|  | C | H |
| Calculated | 66.65 | 6.02 |
| Found | 66.63 | 6.00 |

(b) Methyl ortho-(3-isopropylamino-2-hydroxypropoxy) trans-cinnamate: 234 g. (1 mole) of methyl ortho-(2,3-epoxypropoxy)trans-cinnamate and 236 g. (4 moles) of isopropylamine in solution in 1600 ml. of isopropanol are heated under reflux for 2 hours. Evaporation to dryness takes place and a crystalline compound is obtained. After being recrystallised from hexane the desired product melts at 93° C. (Gallenkamp). The corresponding hydrochloride is obtained by the action of a stream of gaseous hydrochloric acid in a solution in chloroform of the base as previously obtained, a volume of ether is added and caused to crystallise in a refrigerator. The hydrochloride melts at 161° C. (Gallenkamp) after recrystallisation from isopropanol. 270 g. of hydrochloride are obtained, i.e. a yield of 82%.

GRAVIMETRIC ANALYSIS
$C_{15}H_{23}NO_4$, HCl    M.W.=329.81

|  | Percent | | |
|---|---|---|---|
|  | C | H | N |
| Calculated | 58.26 | 7.33 | 4.24 |
| Found | 58.23 | 7.30 | 4.25 |

The NMR spectrum shows coupling constants of 16 cp. for —CH=CH—, which corresponds well to a trans derivative.

EXAMPLE 2

Ortho-(3-isopropylamino-2-hydroxypropoxy) trans-cinnamic acid

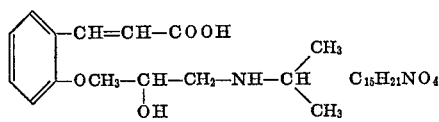

5 g. of methyl ortho-(3-isopropylamino-2-hydroxypropoxy)-cinnamate, obtained according to Example 1, are placed at 95–100° C. on a water bath for 1½ hours in 60 ml. of normal sodium hydroxide solution. The limpid solution which is obtained is cooled and acidified to pH 2 with 5N-hydrochloride acid. This solution is evaporated to dryness under vacuum by heating on the water bath, whereafter this residue is dried, always under vacuum, to constant weight. It is taken up in 40 ml. of boiling absolute ethanol and filtered. After cooling, the alcoholic solution is diluted with 3 volumes of ether and placed in a refrigerator. The hydrochloride of the ortho-(3 - isopropylamino - 2 - hydroxypropoxy) trans-cinnamic acid, melting at 160–162° C., is obtained with a yield of 78%.

GRAVIMETRIC ANALYSIS
$C_{15}H_{21}NO_4$, HCl    $C_{15}H_{22}ClNO_4$    M.W.=315.79

|  | Percent | | |
|---|---|---|---|
|  | C | H | N |
| Calculated | 57.05 | 7.02 | 7.44 |
| Found | 56.83 | 7.18 | 4.52 |

EXAMPLE 3

β-diethylaminoethyl-ortho-(3-isopropylamino-2-hydroxypropoxy)-trans-cinnamate

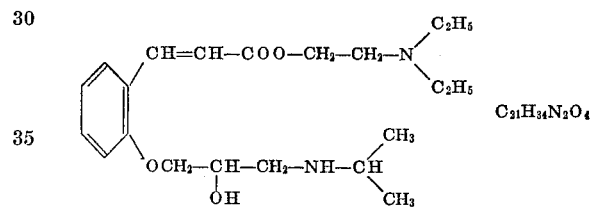

12.6 g. (0.04 mole) of ortho-(3-isopropylamino-2-hydroxy-propoxy) trans-cinnamic acid hydrochloride, obtained according to Example 2, are placed in 300 ml. of absolute ethanol in the presence of 4.5 g. (0.08 mole) of potash. Filtration is carried out to eliminate the forming KCl, followed by evaporation to dryness. 300 ml. of acetone and 5.4 g. (0.04 mole) of chlorotriethylamine are added and refluxing for 5 hours takes place. The acetone is then evaporated and the oily residue is taken up in ether. This is washed with water and the ether is evaporated, the oily residue crystallising by scratching in a beaker. This is recrystallised from hexane, to obtain 4.5 g. of the desired product, melting at 70° C. on a Kofler bench.

GRAVIMETRIC ANALYSIS
$C_{21}H_{34}N_2O_4$    M.W.=378.50

|  | Percent | | |
|---|---|---|---|
|  | C | H | N |
| Calculated | 66.64 | 9.05 | 7.40 |
| Found | 66.60 | 9.03 | 7.40 |

The corresponding oxalate is obtained within the ether. This acid dioxalate melts at 135° C. (Gallenkamp) after crystallisation in the mixture of methanol and ether.

$C_{21}H_{34}N_2O_4$, 2 $C_2H_2O_4$    $C_{25}H_{38}N_2O_{12}$    M.W.=558.57

|  | Percent | | |
|---|---|---|---|
|  | C | H | N |
| Calculated | 53.75 | 6.86 | 5.02 |
| Found | 53.78 | 6.89 | 5.03 |

EXAMPLE 4

Methyl-2-(3'-isopropylamino-2'-hydroxypropoxy)-5-bromo-trans-cinnamate

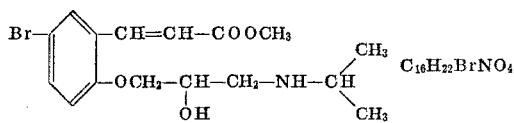

1. Preparation of the methyl 5-bromo-2-hydroxy-trans-cinnamate:

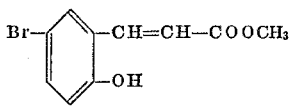

21.5 g. (0.095 mole) of 6-bromocoumarine (m.p.=164° C.) are placed in 190 ml. of anhydrous methanol in the presence of 6.5 g. of anhydrous sodium methylate. Heating for 6 hours under reflux is carried out and the methanol is evaporated on a water bath under vacuum. The residue is taken up in hot water and acidified by 0.5N.HCl. The white precipitate is suction-filtered and washed with water to the point of neutrality. The product is dried and then recrystallised from benzene. The desired ester is obtained in the form of white crystals which melt at 164° C. (Kofler bench).

2. Methyl - 2-(2',3'-epoxypropoxy)-5-bromo-trans-cinnamate:

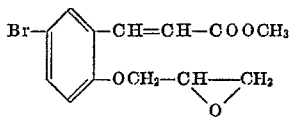

A mixture of 7.2 g. (0.028 mole) of methyl-5-bromo-2-hydroxy trans-cinnamate with 3.9 g. (0.042 mole) of epichlorhydrin, 4.7 g. (0.0336 mole) of anhydrous potassium carbonate and 30 ml. of acetone is refluxed for 14 hours. The acetone is then evaporated under vacuum after filtration, and the residue which crystallises is taken up in a mixture of benzene and hexane. The insoluble product is eliminated and the solvents are once again evaporated under vacuum. The crystalline residue is recrystallised from hexane. There are obtained 3.8 g. of the desired epoxide in the form of white crystals melting at 55° C. on the Kofler bench.

3. Methyl - 2-(3'-isopropylamino-2'-hydroxypropoxy)-5-bromo-trans-cinnamate: 2.8 g. (0.009 mole) of epoxide as obtained above are placed in 15 ml. of isopropanol in the presence of 2.1 g. (0.036 mole) of isopropylamine. This solution is refluxed for 2 hours. The solvent is removed under vacuum and the residue is taken up in 50 ml. of normal HCl. The hydrochloric acid solution is washed in 50 ml. of ether and made alkaline with 10% sodium hydroxide solution. The product precipitates in the form of white crystals melting at 110° C. (Kofler). They are taken up in chloroform, the solution is dried over $Na_2SO_4$ and acidified with gaseous HCl. The hydrochloride is recrystallised in the form of white crystals melting at 156° C. (Gallenkamp) with a yield of 56%.

GRAVIMETRIC ANALYSIS $C_{16}H_{22}BrNO_4$, HCl    $C_6H_{23}BrClNO_4$    M.W.=408.72

|  | Percent | | |
|---|---|---|---|
|  | C | H | N |
| Calculated | 47.02 | 5.67 | 3.43 |
| ound | 47.00 | 5.68 | 3.40 |

EXAMPLE 5

N-carbamimidoyl-2-(3'-isopropylamino-2'-hydroxypropoxy)trans-cinnamide

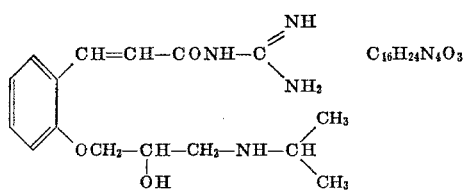

6.3 g. (0.02 mole) of ortho-(3-isopropylamino-2-hydroxypropoxy) cinnamic acid hydrochloride (Example 2) are heated under reflux for 3 hours with 1.77 g. (0.03 mole) of guanidine base in 20 ml. of pyridine. The solution is evaporated to dryness and made alkaline with 30% NaOH. The oil which decants is washed with water, placed in 50 ml. of methanol and dried over $Na_2SO_4$. By the action of a stream of dry hydrochloric acid gas in this solution, the hydrochloride is precipitated and this, recrystallised from methanol-ether, melts at 130° C. (Gallenkamp). Yield 43%.

GRAVIMETRIC ANALYSIS $C_{16}H_{24}N_4O_2$, 2HCl    M.W.=393.31

|  | Percent | | |
|---|---|---|---|
|  | C | H | N |
| Calculated | 48.86 | 6.66 | 14.25 |
| Found | 48.76 | 6.70 | 14.18 |

EXAMPLE 6

Methyl ortho-(3-terbutylamino-2-hydroxypropoxy) trans-cinnamate

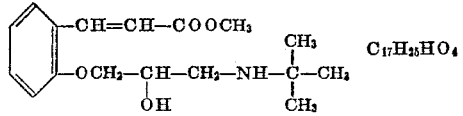

3.5 g. (0.015 mole) of methyl ortho-(2,3 - epoxypropoxy) trans-cinnamate, prepared as in Example 1, are placed under reflux for 2 hours with 4.4 g. (0.06 mole) of terbutylamine in 25 ml. of isopropanol. The excess of amine and isopropanol is then evaporated under vacuum. The residual product crystallises. Recrystallised from hexane, it melts at 106° (Gallenkamp). The hydrochloride is prepared by a stream of gaseous hydrochloric acid on a ethereal solution of the above base. The hydrochloride obtained (4.1 g.–80%) melts at 162° C., with a recrystallisation from methanol-ether mixture.

GRAVIMETRIC ANALYSIS $C_{17}H_{25}NO_4$, HCl    $C_{17}H_{26}ClNO_4$    M.W.=345.84

|  | Percent | | |
|---|---|---|---|
|  | C | H | N |
| Calculated | 59.38 | 7.62 | 4.08 |
| Found | 59.43 | 7.64 | 4.10 |

EXAMPLE 7

Ethyl ortho-(3-isopropylamino-2-hydroxypropoxy) trans-cinnamate

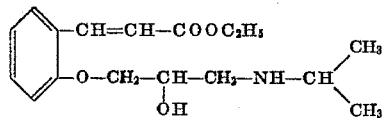

(a) Preparation of the ethyl ortho-(2,3-epoxypropoxy) trans-cinnamate: 17.3 g. (0.09 mole) of ethyl ortho-hydroxy trans-cinnamate (m.p. 85–87° C.), 12.5 g. (0.135 mole) of epichlorhydrin and 90 ml. of acetone are heated for 14 hours under reflux in the presence of 15 g. of pure and dry $K_2CO_3$. The acetone is evaporated under vacuum and the epoxide obtained is rectified, this distilling at 140° C./0.14 millibar. The product is obtained with a yield of 49%.

(b) Preparation of the ethyl ortho-(3-isopropylamino-2-hydroxypropoxy) trans-cinnamate: 8.4 g. (0.034 mole) of the above epoxide are brought under reflux for 2 hours with 8.02 g. (0.136 mole) of isopropylamine in the presence of 60 ml. of isopropanol. Evaporation to dryness is carried out under vacuum on a water bath. The substance is taken up in 50 ml. of normal hydrochloric acid, the solution is washed with ether and, after decantation, the aqueous solution is made alkaline. The product precipitates in the oily state and quickly crystallises. It melts at 94° C. (Gallenkamp) after recrystallisation from hexane. This product is dissolved in ether and the hydrochloride is formed therefrom by a stream of gaseous hydrochloric acid. After recrystallisation from ethanol-ether, it melts at 139° C. Gallenkamp). The yield is 7.4 g., i.e. 63%.

GRAVIMETRIC ANALYSIS

| $C_{17}H_{25}NO_4$, HCl | $C_{17}H_{26}ClNO_4$ | M.W.=343.84 |
|---|---|---|

| | Percent | | |
|---|---|---|---|
| | C | H | N |
| Calculated | 59.38 | 7.62 | 4.08 |
| Found | 59.23 | 7.75 | 4.23 |

EXAMPLE 8 n-Propyl ortho-(3-isopropylamino-2-hydroxypropoxy) trans-cinnamate

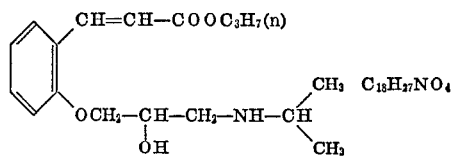

(a) Preparation of the n-propyl ortho-(2,3-epoxypropoxy) trans-cinnamate: 27.3 g. of n-propyl ortho-hydroxy trans-cinnamate (M.P.=70° C., Annalen 413, 266) and 185 g. (0.2 mole) of epichlorhydrin are refluxed in 130 ml. of acetone in the presence of 22.1 g. of pure and dry $K_2CO_3$. After refluxing for 14 hours, the solvents are filtered and evaporated under vacuum. The epoxide, which has a boiling point of 153° C./0.28 mm., is rectified. 17.5 g. of product, i.e. 53%, are obtained.

(b) 18.34 g. (0.07 mole) of epoxide prepared as above are refluxed for 3 hours with 16.5 g. (0.28 mole) of isopropylamine in 100 ml. of isopropanol. By evaporation of the amine excess and the solvent, there is obtained a white crystalline product which, after recrystallisation from hexane, melts at 85° C. (Gallenkamp).

The hydrochloride is obtained by the action of gaseous hydrochloric acid on the above base, brought into solution in a mixture of ether and chloroform. After recrystallisation from isopropanol, there is obtained the corresponding hydrochloride, melting at 121° C. (Gallenkamp). Yield 14 g., i.e. 50%.

GRAVIMETRIC ANALYSIS

| $C_{18}H_{27}NO_4$, HCl | $C_{18}H_{28}ClNO_4$ | M.W.=357.87 |
|---|---|---|

| | Percent | | |
|---|---|---|---|
| | C | H | N |
| Calculated | 60.41 | 7.89 | 3.91 |
| Found | 60.43 | 7.86 | 3.93 |

EXAMPLE 9

Isopropyl ortho-(3-isopropylamino-2-hydroxypropoxy)trans-cinnamate

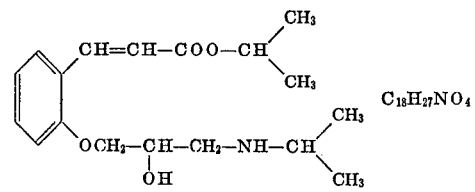

(a) Isopropyl ortho-(2,3 - epoxypropoxy)-cinnamate: 27.3 g. (0.13 mole) of isopropyl ortho-hydroxy trans-cinnamate (m.p.=90° C. Kofler) are refluxed with 18.5 g. (0.2 mole) of epichlorohydrin in 130 ml. of acetone and 22.1 g. (0.48 mole) of anhydrous $K_2CO_3$. After refluxing for 14 hours, the acetone is eliminated and the product is rectified. The epoxide distils at 148° C./0.15 millibar. 20 g. of product are obtained, i.e. a yield of 59%.

(b) 20 g. (0.076 mole) of the epoxide described above are heated under reflux for 3 hours with 17.9 g. (0.304 mole) of isopropylamine in 110 ml. of isopropanol. The solvents are evaporated under vacuum on a water bath. The isopropyl ortho-(3-iso-propylamino-2-hydroxypropoxy) cinnamate is obtained by being crystallised in hexane. It melts at 55° C. (Gallenkamp). For obtaining its hydrochloride, the product is taken up before crystallisation in 100 ml. of ether and a stream of gaseous hydrochloric acid is caused to enter this solution. The hydrochloride precipitates, it is suction-filtered, washed with ether and recrystallised from isopropanol. There are obtained 14 g. of product, melting at 129° C. (Gallenkamp)—yield 50%.

GRAVIMETRIC ANALYSIS

| $C_{18}H_{27}NO_4$, HCl | $C_{18}H_{28}ClNO_4$ | M.W.=357.87 |
|---|---|---|

| | Percent | | |
|---|---|---|---|
| | C | H | N |
| Calculated | 60.41 | 7.89 | 3.91 |
| Found | 60.45 | 7.86 | 3.90 |

EXAMPLE 10 n-Butyl ortho-(3-isopropylamino-2-hydroxypropoxy)trans-cinnamate

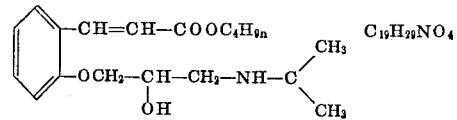

(a) n - butyl ortho - (2,3-epoxypropoxy)trans-cinnamate: 8.4 g. (0.038 mole) of n-butyl ortho-coumarate (m.p.=90° C. Kofler) are heated under reflux for 14 hours with 5.3 g. (0.057 mole) of epichlorhydrin in the presence of 6.3 g. (0.045 mole) of potassium carbonate in 40 ml. of acetone. The solution is filtered and the acetone is evaporated on a water bath. The epoxide is rectified. Its boiling point is 140° C./0.18 millibar-yield 6.4 g. i.e. 73%.

(b) 6.4 g. (0.023 mole) of this epoxide are brought under reflux for 3 hours with 5.5 g. (0.092 mole) of isopropylamine in 40 ml. of isopropanol. The excess of isopropylamine and the isopropanol are distilled. The desired product crystallises. Recrystallised from hexane, it melts at 82° C. (Kofler); formed into a solution in chloroform and ether, the hydrochloride is obtained therefrom by the action of gaseous hydrochloric acid. This hydrochloride, after recrystallisation from isopropanol, melts at 113° C. (Gallenkamp). Yield 63%.

GRAVIMETRIC ANALYSIS $C_{19}H_{29}NO_4$, HCl   $C_{19}H_{30}ClNO_4$   M.W.=371.89

|  | Percent | | |
| --- | --- | --- | --- |
|  | C | H | N |
| Calculated | 61.36 | 8.13 | 3.77 |
| Found | 61.35 | 8.15 | 3.70 |

What we claim is:

1. An aminoalcohol derived from ortho-trans-hydroxycinnamic acids, of the formula

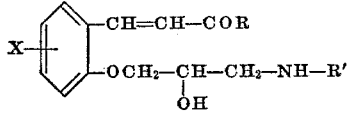

in which R is a member of the group consisting of an hydroxy and lower alkoxy; R' is a lower alkyl radical; X is hydrogen or bromine.

2. An amino alcohol according to claim 1 wherein R is lower alkoxy, R' is isopropyl and X is hydrogen.

3. An amino alcohol according to claim 2 wherein R is methoxy.

4. An amino alcohol according to claim 2 wherein R is ethoxy.

5. An amino alcohol according to claim 2 wherein R is propoxy or isopropoxy.

6. An amino alcohol according to claim 2 wherein R is butoxy.

7. An amino alcohol according to claim 1 wherein R is hydroxy, R' is isopropyl and X is hydrogen.

8. An amino alcohol according to claim 1 wherein R is lower alkoxy, R' is isopropyl and X is bromine.

9. An amino alcohol according to claim 1 wherein R' is isopropyl and X is hydrogen.

10. A compound $\beta$ - diethylaminoethyl-ortho-(3 - isopropylamino-2-hydroxypropoxy)-trans-cinnamate.

References Cited (A) Finar, I. R.: *Organic Chemistry*, Vol. I, (1963), pub. by Richard Clay and Co. Ltd. of Great Britain (QD251 F56), pp. 191, 193 and 252 relied on.

LORRAINE A. WEINBERGER, Primary Examiner

L. A. THAXTON, Assistant Examiner

U.S. Cl. X.R.

260—348 A, 472, 519, 559 A; 424—309, 319, 324